(12) United States Patent
Kiser et al.

(10) Patent No.: US 11,265,530 B2
(45) Date of Patent: Mar. 1, 2022

(54) STEREOSCOPIC CAMERA

(71) Applicant: Contrast, Inc., Albuquerque, NM (US)

(72) Inventors: Willie C. Kiser, Albuquerque, NM (US); Michael D. Tocci, Albuquerque, NM (US); Nora Tocci, Albuquerque, NM (US)

(73) Assignee: Contrast, Inc., Albuquerque, NM (US)

( * ) Notice: Subject to any disclaimer, the term of this patent is extended or adjusted under 35 U.S.C. 154(b) by 0 days.

(21) Appl. No.: 16/028,876

(22) Filed: Jul. 6, 2018

(65) Prior Publication Data

US 2019/0014308 A1 Jan. 10, 2019

Related U.S. Application Data

(60) Provisional application No. 62/530,397, filed on Jul. 10, 2017.

(51) Int. Cl.
*H04N 5/235* (2006.01)
*H04N 13/239* (2018.01)
*H04N 5/232* (2006.01)
*H04N 13/257* (2018.01)
*H04N 5/225* (2006.01)
*H04N 13/243* (2018.01)

(52) U.S. Cl.
CPC ......... *H04N 13/239* (2018.05); *H04N 5/2254* (2013.01); *H04N 5/22541* (2018.08); *H04N 5/2355* (2013.01); *H04N 5/23238* (2013.01); *H04N 13/243* (2018.05); *H04N 13/257* (2018.05)

(58) Field of Classification Search
None
See application file for complete search history.

(56) References Cited

U.S. PATENT DOCUMENTS 2,560,351 A 7/1951 Kell
2,642,487 A 6/1953 Schroeder
(Continued)

FOREIGN PATENT DOCUMENTS

CN 101344706 B 9/2010
EP 0484802 A2 5/1992
(Continued)

OTHER PUBLICATIONS

Borer, 2014, Non-linear opto-electrical transfer functions for high dynamic range television, Research and Development White Paper, British Broadcasting Corporation (24 pages).
(Continued)

*Primary Examiner* — Shadan E Haghani
(74) *Attorney, Agent, or Firm* — Brown Rudnick LLP; Thomas C. Meyers

(57) ABSTRACT

Stereoscopic cameras include two wide-angle lenses, such as panoramic lenses, stacked one above the other to create 3D images and maps with very wide fields of view of the environment. The cameras may include panoramic annual lenses (PALs) that take a 360 degree view of the environment. Image processing is used, on a frame-by-frame basis, to map the apparent distance to all features within the scene. The camera may be operated to produce a video or map output in which each pixel has not only red (R), green (G), and blue (B) values, but also has depth (D) value.

11 Claims, 12 Drawing Sheets

(56) References Cited

U.S. PATENT DOCUMENTS

| | | |
|---|---|---|
| 2,971,051 A | 2/1961 | Back |
| 3,202,039 A | 8/1965 | DeLang |
| 3,381,084 A | 4/1968 | Wheeler |
| 3,474,451 A | 10/1969 | Abel |
| 3,601,480 A | 8/1971 | Randall |
| 3,653,748 A | 4/1972 | Athey |
| 3,659,918 A | 5/1972 | Tan |
| 3,668,304 A | 6/1972 | Eilenberger |
| 3,720,146 A | 3/1973 | Yost, Jr. |
| 3,802,763 A | 4/1974 | Cook et al. |
| 3,945,034 A | 3/1976 | Suzuki |
| 4,009,941 A | 3/1977 | Verdijk et al. |
| 4,072,405 A | 2/1978 | Ozeki |
| 4,084,180 A | 4/1978 | Stoffels et al. |
| 4,134,683 A | 1/1979 | Goetz et al. |
| 4,268,119 A | 5/1981 | Hartmann |
| 4,395,234 A | 7/1983 | Shenker |
| 4,396,188 A | 8/1983 | Dreissigacker et al. |
| 4,486,069 A | 12/1984 | Neil et al. |
| 4,555,163 A | 11/1985 | Wagner |
| 4,584,606 A | 4/1986 | Nagasaki |
| 4,743,011 A | 5/1988 | Coffey |
| 4,786,813 A | 11/1988 | Svanberg et al. |
| 4,805,037 A | 2/1989 | Noble et al. |
| 4,916,529 A | 4/1990 | Yamamoto et al. |
| 4,933,751 A | 6/1990 | Shinonaga et al. |
| 5,024,530 A | 6/1991 | Mende |
| 5,092,581 A | 3/1992 | Koz |
| 5,093,563 A | 3/1992 | Small et al. |
| 5,134,468 A | 7/1992 | Ohmuro |
| 5,153,621 A | 10/1992 | Vogeley |
| 5,155,623 A | 10/1992 | Miller et al. |
| 5,194,959 A | 3/1993 | Kaneko et al. |
| 5,272,518 A | 12/1993 | Vincent |
| 5,386,316 A | 1/1995 | Cook |
| 5,642,191 A | 6/1997 | Mende |
| 5,707,322 A | 1/1998 | Dreissigacker et al. |
| 5,729,011 A | 3/1998 | Sekiguchi |
| 5,734,507 A | 3/1998 | Harvey |
| 5,801,773 A * | 9/1998 | Ikeda ................ H04N 5/20 348/229.1 |
| 5,835,278 A | 11/1998 | Rubin et al. |
| 5,856,466 A | 1/1999 | Cook et al. |
| 5,900,942 A | 5/1999 | Spiering |
| 5,905,490 A | 5/1999 | Shu et al. |
| 5,926,283 A | 7/1999 | Hopkins |
| 5,929,908 A | 7/1999 | Takahashi et al. |
| 6,011,876 A | 1/2000 | Kishner |
| 6,215,597 B1 | 4/2001 | Duncan et al. |
| 6,392,687 B1 | 5/2002 | Driscoll, Jr. et al. |
| 6,633,683 B1 * | 10/2003 | Dinh ................ G06K 9/40 345/611 |
| 6,646,716 B1 | 11/2003 | Ramanujan et al. |
| 6,674,487 B1 | 1/2004 | Smith |
| 6,747,694 B1 | 6/2004 | Nishikawa et al. |
| 6,801,719 B1 | 10/2004 | Szajewski et al. |
| 6,856,466 B2 | 2/2005 | Tocci |
| 7,068,890 B2 | 6/2006 | Soskind et al. |
| 7,084,905 B1 | 8/2006 | Nayar et al. |
| 7,138,619 B1 | 11/2006 | Ferrante et al. |
| 7,177,085 B2 | 2/2007 | Tocci et al. |
| 7,283,307 B2 | 10/2007 | Couture et al. |
| 7,336,299 B2 | 2/2008 | Kostrzewski et al. |
| 7,397,509 B2 | 7/2008 | Krymski |
| 7,405,882 B2 | 7/2008 | Uchiyama et al. |
| 7,714,998 B2 | 5/2010 | Furman et al. |
| 7,719,674 B2 | 5/2010 | Furman et al. |
| 7,731,637 B2 | 6/2010 | D'Eredita |
| 7,961,398 B2 | 6/2011 | Tocci |
| 8,035,711 B2 | 10/2011 | Liu et al. |
| 8,320,047 B2 | 11/2012 | Tocci |
| 8,340,442 B1 | 12/2012 | Rasche |
| 8,441,732 B2 | 5/2013 | Tocci |
| 8,610,789 B1 | 12/2013 | Nayar et al. |
| 8,619,368 B2 | 12/2013 | Tocci |
| 8,622,876 B2 | 1/2014 | Kelliher |
| 8,659,683 B1 | 2/2014 | Linzer |
| 8,982,962 B2 | 3/2015 | Alshin et al. |
| 9,087,229 B2 | 7/2015 | Nguyen et al. |
| 9,129,445 B2 | 9/2015 | Mai et al. |
| 9,131,150 B1 | 9/2015 | Mangiat et al. |
| 9,264,659 B2 * | 2/2016 | Abuan ................ H04N 5/2258 |
| 9,277,122 B1 | 3/2016 | Imura et al. |
| 9,459,692 B1 | 10/2016 | Li |
| 9,560,339 B2 | 1/2017 | Borowski |
| 9,661,245 B2 | 5/2017 | Kawano |
| 9,675,236 B2 | 6/2017 | McDowall |
| 9,677,840 B2 | 6/2017 | Rublowsky et al. |
| 9,720,231 B2 | 8/2017 | Erinjippurath et al. |
| 9,779,490 B2 * | 10/2017 | Bishop ................ H04N 9/045 |
| 9,904,981 B2 * | 2/2018 | Jung ................ G06T 3/4015 |
| 9,948,829 B2 | 4/2018 | Kiser et al. |
| 9,955,084 B1 | 4/2018 | Haynold |
| 9,974,996 B2 | 5/2018 | Kiser |
| 10,165,182 B1 * | 12/2018 | Chen ................ H04N 5/2252 |
| 2002/0014577 A1 | 2/2002 | Ulrich et al. |
| 2002/0089765 A1 | 7/2002 | Nalwa |
| 2003/0007254 A1 | 1/2003 | Tocci |
| 2003/0016334 A1 | 1/2003 | Weber et al. |
| 2003/0048493 A1 | 3/2003 | Pontifex et al. |
| 2003/0072011 A1 | 4/2003 | Shirley |
| 2004/0119020 A1 | 6/2004 | Bodkin |
| 2004/0125228 A1 | 7/2004 | Dougherty |
| 2004/0143380 A1 | 7/2004 | Stam et al. |
| 2004/0179834 A1 | 9/2004 | Szajewski et al. |
| 2005/0001983 A1 | 1/2005 | Weber et al. |
| 2005/0041113 A1 | 2/2005 | Nayar et al. |
| 2005/0099504 A1 | 5/2005 | Nayar et al. |
| 2005/0117799 A1 | 6/2005 | Fuh et al. |
| 2005/0151860 A1 | 7/2005 | Silverstein et al. |
| 2005/0157943 A1 | 7/2005 | Ruggiero |
| 2005/0168578 A1 | 8/2005 | Gobush |
| 2005/0198482 A1 * | 9/2005 | Cheung ................ G06F 9/3897 712/245 |
| 2005/0212827 A1 | 9/2005 | Goertzen |
| 2005/0219659 A1 | 10/2005 | Quan |
| 2006/0001761 A1 | 1/2006 | Haba et al. |
| 2006/0002611 A1 | 1/2006 | Mantiuk et al. |
| 2006/0061680 A1 | 3/2006 | Madhavan et al. |
| 2006/0104508 A1 | 5/2006 | Daly et al. |
| 2006/0184040 A1 | 8/2006 | Keller et al. |
| 2006/0209204 A1 | 9/2006 | Ward |
| 2006/0221209 A1 | 10/2006 | McGuire et al. |
| 2006/0249652 A1 | 11/2006 | Schleifer |
| 2006/0262275 A1 | 11/2006 | Domroese et al. |
| 2007/0025717 A1 | 2/2007 | Raskar et al. |
| 2007/0086087 A1 | 4/2007 | Dent et al. |
| 2007/0189750 A1 | 8/2007 | Wong et al. |
| 2007/0189758 A1 | 8/2007 | Iwasaki |
| 2007/0201560 A1 | 8/2007 | Segall et al. |
| 2007/0258641 A1 | 11/2007 | Srinivasan et al. |
| 2008/0013051 A1 | 1/2008 | Glinski et al. |
| 2008/0030611 A1 | 2/2008 | Jenkins |
| 2008/0055683 A1 | 3/2008 | Choe et al. |
| 2008/0094486 A1 | 4/2008 | Fuh et al. |
| 2008/0100910 A1 | 5/2008 | Kim et al. |
| 2008/0112651 A1 | 5/2008 | Cho et al. |
| 2008/0175496 A1 | 7/2008 | Segall |
| 2008/0198235 A1 | 8/2008 | Chen et al. |
| 2008/0198266 A1 | 8/2008 | Kurane |
| 2008/0297460 A1 | 12/2008 | Peng et al. |
| 2009/0059048 A1 | 3/2009 | Luo et al. |
| 2009/0213225 A1 | 8/2009 | Jin et al. |
| 2009/0225433 A1 | 9/2009 | Tocci |
| 2009/0244717 A1 | 10/2009 | Tocci |
| 2009/0290043 A1 | 11/2009 | Liu et al. |
| 2010/0201799 A1 | 8/2010 | Mohrholz et al. |
| 2010/0225783 A1 | 9/2010 | Wagner |
| 2010/0271512 A1 | 10/2010 | Garten |
| 2010/0328780 A1 | 12/2010 | Tocci |
| 2011/0028278 A1 | 2/2011 | Roach |
| 2011/0058050 A1 | 3/2011 | Lasang et al. |
| 2011/0188744 A1 | 8/2011 | Sun |
| 2011/0194618 A1 | 8/2011 | Gish et al. |

(56) References Cited

U.S. PATENT DOCUMENTS

| | | |
|---|---|---|
| 2011/0221793 A1 | 9/2011 | King, III et al. |
| 2012/0025080 A1 | 2/2012 | Liu et al. |
| 2012/0134551 A1 | 5/2012 | Wallace |
| 2012/0147953 A1 | 6/2012 | El-Mahdy et al. |
| 2012/0179833 A1 | 7/2012 | Kenrick et al. |
| 2012/0212964 A1 | 8/2012 | Chang et al. |
| 2012/0241867 A1 | 9/2012 | Ono et al. |
| 2012/0242867 A1 | 9/2012 | Shuster |
| 2012/0299940 A1 | 11/2012 | Dietrich, Jr. et al. |
| 2013/0021447 A1 | 1/2013 | Brisedoux et al. |
| 2013/0021505 A1 | 1/2013 | Plowman et al. |
| 2013/0038689 A1 | 2/2013 | McDowall |
| 2013/0063300 A1 | 3/2013 | O'Regan et al. |
| 2013/0093805 A1 | 4/2013 | Iversen |
| 2013/0094705 A1 | 4/2013 | Tyagi et al. |
| 2013/0194675 A1 | 8/2013 | Tocci |
| 2013/0250113 A1 | 9/2013 | Bechtel et al. |
| 2013/0286451 A1 | 10/2013 | Verhaegh |
| 2013/0329053 A1 | 12/2013 | Jones et al. |
| 2014/0002694 A1 | 1/2014 | Levy et al. |
| 2014/0063300 A1 | 3/2014 | Lin et al. |
| 2014/0085422 A1 | 3/2014 | Aronsson et al. |
| 2014/0132946 A1 | 5/2014 | Sebastian et al. |
| 2014/0152694 A1 | 6/2014 | Narasimha et al. |
| 2014/0168486 A1 | 6/2014 | Geiss |
| 2014/0184894 A1 | 7/2014 | Motta |
| 2014/0192214 A1 | 7/2014 | Laroia |
| 2014/0198187 A1 | 7/2014 | Lukk |
| 2014/0210847 A1 | 7/2014 | Knibbeler et al. |
| 2014/0263950 A1 | 9/2014 | Fenigstein et al. |
| 2014/0313369 A1 | 10/2014 | Kageyama et al. |
| 2015/0201222 A1 | 7/2015 | Mertens |
| 2015/0208024 A1 | 7/2015 | Takahashi et al. |
| 2015/0296140 A1 | 10/2015 | Kim |
| 2015/0302562 A1 | 10/2015 | Zhai et al. |
| 2015/0312498 A1 | 10/2015 | Kawano |
| 2015/0312536 A1 | 10/2015 | Butler et al. |
| 2016/0050354 A1 | 2/2016 | Musatenko et al. |
| 2016/0057333 A1 | 2/2016 | Liu et al. |
| 2016/0163356 A1 | 6/2016 | De Haan et al. |
| 2016/0173811 A1 | 6/2016 | Oh et al. |
| 2016/0205368 A1 | 7/2016 | Wallace et al. |
| 2016/0252727 A1 | 9/2016 | Mack et al. |
| 2016/0323518 A1 | 11/2016 | Rivard et al. |
| 2016/0345032 A1 | 11/2016 | Tsukagoshi |
| 2016/0353123 A1 | 12/2016 | Ninan |
| 2016/0360212 A1 | 12/2016 | Dai et al. |
| 2016/0375297 A1 | 12/2016 | Kiser |
| 2017/0006273 A1 | 1/2017 | Borer et al. |
| 2017/0070719 A1 | 3/2017 | Smolic et al. |
| 2017/0126987 A1 | 5/2017 | Tan et al. |
| 2017/0155818 A1 | 6/2017 | Bonnet |
| 2017/0155873 A1 | 6/2017 | Nguyen |
| 2017/0237879 A1 | 8/2017 | Kiser et al. |
| 2017/0237890 A1 | 8/2017 | Kiser et al. |
| 2017/0237913 A1 | 8/2017 | Kiser et al. |
| 2017/0238029 A1 | 8/2017 | Kiser et al. |
| 2017/0279530 A1 | 9/2017 | Tsukagoshi |
| 2018/0048801 A1 | 2/2018 | Kiser et al. |
| 2018/0198957 A1 | 7/2018 | Kiser et al. |

FOREIGN PATENT DOCUMENTS

| | | | |
|---|---|---|---|
| EP | 1225574 | A2 | 7/2002 |
| EP | 1395062 | A1 | 3/2004 |
| GB | 2526047 | A | 11/2015 |
| GB | 2539917 | A | 1/2017 |
| JP | S53093026 | A | 8/1978 |
| JP | S53124028 | A | 10/1978 |
| JP | S60213178 | A | 10/1985 |
| JP | S63160489 | A | 7/1988 |
| JP | H0468876 | A | 3/1992 |
| JP | H0564070 | A | 3/1993 |
| JP | H06335006 | A | 12/1994 |
| JP | H07107346 | A | 4/1995 |
| JP | H08220585 | A | 8/1996 |
| JP | H11127441 | A | 5/1999 |
| JP | 2000019407 | A | 1/2000 |
| JP | 2000338313 | A | 12/2000 |
| JP | 2001136434 | A | 5/2001 |
| JP | 2002165108 | A | 6/2002 |
| JP | 2003035881 | A | 2/2003 |
| JP | 2007295326 | A | 11/2007 |
| WO | 2005025685 | A1 | 3/2005 |
| WO | 2009/111642 | A1 | 9/2009 |
| WO | 2009/121068 | A2 | 10/2009 |
| WO | 2011/032028 | A2 | 3/2011 |
| WO | 2012/076646 | A1 | 6/2012 |
| WO | 2015/072754 | A1 | 5/2015 |
| WO | 2015/173570 | A1 | 11/2015 |
| WO | 2017/157845 | A1 | 9/2017 |

OTHER PUBLICATIONS

Bravo, 2011, Efficient smart CMOS camera based on FPGAs oriented to embedded image processing, Sensors 11:2282-2303.

Extended European Search Report for EP 17750845.4 dated Aug. 19, 2019 (8 pages).

Extended European Search Report for EP 17750846.2 dated Aug. 19, 2019 (9 pages).

Extended European Search Report dated Aug. 19, 2019, for European patent application No. 17750844.7 (10 pages).

Lyu, 2014, A 12-bit high-speed col. parallel two-step single-slope analog-to-digital converter (ADC) for CMOS mage sensors, Sensors 14:21603-21625.

Machine translation of JPH08220585 generated by European Patent Office dated Oct. 15, 2019 (11 pages).

Rahman, 2011, Pipeline synthesis and optimization of FPGA-based video processing applications with CAL, EURASIP J Image Vid Processing 19:1-28.

Schulte, 2016, HDR Demystified: Emerging UHDTV systems, SpectraCal 1-22.

Sony, 2017, HDR (High Dynamic Range), Sony Corporation (15 pages).

International Search Report and Written Opinion dated Sep. 20, 2018, for International Application No. PCT/US2018/041034 (10 pages).

Abstract of JP 2000019407 A (2 pages).

Abstract of JP 2003035881 A (2 pages).

Abstract of JP S60213178 A (2 pages).

Aggarwal, 2004, Split Aperture Imaging for High Dynamic Range, Int J Comp Vis 58(1):7-17.

Alleysson, 2006, HDR CFA Image Rendering, Proc EURASIP 14th European Signal Processing Conf.

Banterle, 2009, High dynamic range imaging and low dynamic range expansion for generating HDR content, Eurographics State of the The Art Report (18 pages).

Debevec, 1997, Recovering High Dynamic Range Radiance Maps from Photographs, Int Conf Comp Graphics and Interactive Techniques, proceedings.

Flux Data Inc, 2008, FD-1665 High Resolution 3 CCD Multispectral Industrial Camera, web.archive.orgweb20080113023949www.fluxdata.com/prod (7 pages).

International Search Report and Written Opinion dated Apr. 14, 2017, for PCT/US17/17396 filed Feb. 10, 2017 (9 pages).

International Search Report and Written Opinion dated Apr. 28, 2017, for PCT/US17/17405, filed Feb. 10, 2017 (9 pages).

International Search Report and Written Opinion dated May 2, 2017, for PCT/US17/16991, filed Feb. 8, 2017 (7 pages).

International Search Report and Written Opinion dated May 8, 2017, for PCT/US17/17400 filed Feb. 10, 2017 (8 pages).

International Search Report and Written Opinion dated Oct. 23, 2017, for International application No. PCT/US17/45683, with International filing date Aug. 7, 2017 (5 pages).

Kao, 2008, High Dynamic Range Imaging by Fusing Multiple Raw Images and Tone Reproduction, IEEE Transactions on Consumer Electronics 54(1): 10-15.

(56) References Cited

OTHER PUBLICATIONS

Lukac, 2004, Demosaicked Image Postprocessing Using Local Color Ratios, IEEE Transactions on Circuits and Systems for Video Technology 14(6):914-920.
Machine translation of CN 101344706 B, generated on May 19, 2017, by espacenet (11 pages).
Machine translation of JP 2000019407 A generated on May 30, 2017, by EPO website (52 pages).
Machine translation of JP 2000338313 A generated on Decmber 21, 2016, by Espacenet (9 pages).
Machine translation of JP 2001136434 A generated on Dec. 21, 2016, by Espacent (25 pages).
Machine translation of JP 2002165108 A generated on Dec. 21, 2016, by Espacenet (27 pages).
Machine translation of JP 2003035881 Agenertaed on May 30, 2017, by EPO website (19 pages).
Machine translation of JP 2007295326 A generated on Dec. 21, 2016, by the European Patent Office website Espacent (12 pages).
Machine translation of JP H04068876 A generated on Dec. 21, 2016, by Espacent (8 pages).
Machine translation of JP H0564070 A generated on Dec. 21, 2016, by Espacenet (19 pages).
Machine translation of JP H06335006 A generated on Dec. 21, 2016, by Espacenet (9 pages).
Machine translation of JP H07107346 generated on Dec. 21, 2016, by Espacent (21 pages).
Machine translation of JP S53093026 A, issued as JP S599888, generated on Dec. 21, 2016 (5 pages).
Machine translation of JP S60213178 A generated on May 30, 2017, by EPO website (6 pages).
Myszkowki, 2008, High Dynamic Range Video, Morgan & Claypool Publishers, San Rafael, CA (158 pages).
Nayar, 2000, High dynamic range imaging: spatially varying pixel exposures, 2000 Proc IEEE Conf on Comp Vision and Pattern Rec, ISSN: 1063-6919.
Stumpfel, 2004, Direct HDR Capture of the Sun and Sky, Computer graphics, virtual reality, visualisation and interaction in Africa (9 pages).
Tiwari, 2015, A review on high-dynamic range imaging with its technique, Int J Sig Proc, IPPR 8(9):93-100.
Tocci, 2011, A versatile HDR video production system, ACM Transactions on Graphics (TOG)—Proceedings of ACM SIGGRAPH 2011, 30(4):article 41.
Touze, 2014, HDR video coding based on local LDR quantization, Second International Conference and SME Workshop on HDR imaging.
Altera, 2010, Memory System Design, Chapter 7 in Embedded Design Handbook, Altera Corporation (18 pages).
Dhanani, 2008, HD video line buffering in FPGA, EE Times (5 pages).
Gurel, 2016, A comparative study between RTL and HLS for image processing applications with FPGAs, Thesis, UC San Diego (78 pages).
Hegarty, 2014, Darkroom: compiling high-level image processing code into hardware pipelines, ACM Trans Graph 33(4):144.
Lawal, 2007, C++ based system synthesis of real-time video processing systems targeting FPGA implementation, IEEE Int Par Dist Proc Symposium, Rome, pp. 1-7.
Lawal, 2008, Memory synthesis for FPGA implementations of real-time video processing systems, Thesis, Mid Sweden U (102 pages).

\* cited by examiner

STEREOSCOPIC CAMERA

CROSS-REFERENCE TO RELATED APPLICATION

This application claims benefit of U.S. Provisional Application Ser. No. 62/530,397, filed Jul. 10, 2017, the contents of which are incorporated by reference.

TECHNICAL FIELD

The disclosure relates to imaging cameras and methods for image mapping.

BACKGROUND

In conventional active stereo imaging, two or more imaging cameras are used to image a scene. Sophisticated image processing is then used, on a frame-by-frame basis, to map the apparent distance to all the features in the scene, giving each pixel in a video not only the typical red (R), green (G), and blue (B) values, but also an additional depth (D) value. The typical method for performing this active stereo distance-mapping is to place two cameras side-by-side (the way human eyes are arranged, with optical axes lying parallel to one another, but not co-axial with one another), and then the scene is processed to match the pixels from one camera to the corresponding pixels in the other camera. By carefully calculating the amount of parallax present for each pixel in a scene, and knowing the horizontal displacement distance between the two cameras, it is a straightforward process to calculate the depth to each pixel.

While the field of active stereo imaging is well understood, no viable method has been proposed for performing real-time active stereo imaging on a full 360-degree panoramic field of view.

SUMMARY

The invention provides stereoscopic cameras in which at least two lenses, such as panoramic lenses, are stacked vertically to image in three dimensions over a wide field of view without any lens blocking any part of the field of view of another lens.

In a preferred embodiment, the present invention comprises a pair of Panoramic Annular Lenses (PALs), each with a corresponding image sensor, to capture a panoramic scene from two slightly-displaced points of view. In order to prevent the PALs from partially blocking each other's panoramic field-of-view, the PALs are displaced vertically instead of the conventional horizontal placement. Because each PAL 'sees' a 360-degree panorama in azimuth, but only a relatively small range of angles in elevation (for example, about 75-degrees), each PAL can be located in the other PALs 'blind spot', and in this way not block any of the field of view.

In another embodiment, multiple sensors (i.e., more than one) are used with each lens to achieve true high-dynamic-range (HDR) panoramic active stereo imaging. Because of the panoramic field of view, which will typically encounter objects in both deep shadow and bright illumination simultaneously, adding HDR to this system is highly beneficial Cameras of the invention comprise HDR functionality through the use of beam-splitters, multiple sensors, and real-time, pipeline processing of image pixels. For HDR, a beamsplitter splits incoming light onto high and low exposure sensors, and a processor merges the pixels from those sensors while replacing saturated pixels from the high exposure sensor with corresponding pixels from a sensor of lower exposure. Each lens of the invention can be coupled to such an HDR arrangement of sensors. This provides true HDR panoramic active stereo imaging. Because of the panoramic field of view and HDR imaging, the camera is able to accurately image objects in both deep shadow and bright illumination simultaneously, around a 360 degree field of view.

Stereoscopic cameras of the invention may use multiple vertically-stacked panoramic lenses arranged with respect to each other in optimum configuration to perform 360 degree imaging with a depth component, and thus are useful tools for room-mapping, i.e., for capturing a 3-D data set that includes the locations and distances to and between features within the room.

Preferred embodiments of the invention comprise PALs. A panoramic annular lens (PAL) uses a single piece of glass, with spherical surfaces, to produce a flat annular image of the entire 360° surround of the optical axis of the lens. In cameras of the invention, two such PALs (or multiple pairs of PALs) are displaced along a vertical axis (i.e., one PAL is stacked above the other). Cameras of the invention may include two or more such pairs of PALs, with each pair's shared optical axis substantially orthogonal to the axis of any other pair. By including multiple units of paired PALs, the camera is more robust and captures great detail about the environment.

In certain aspects, the invention provides a camera that includes a first lens and a second lens that each have a azimuthal angle of view of at least 180 degrees, wherein neither of the first lens and the second lens is within the field of view of the other. The camera includes one or more image sensors that receive light from the first and second lens and a processing device coupled to the one or more image sensors that forms a 3-D map or image from the received light. The processing device may be, for example, a field-programmable gate array (FPGA), or an application specific integrated circuit (ASIC), or a computer system comprising one or more Graphical Processing Units (GPUs). The 3-D map is preferably formed as a real-time video of an environment. The first and second lenses may each be a wide-angle or panoramic lens with a wide angle of coverage in azimuth (e.g., at least 180 degrees). The first and second lenses are "stacked", i.e., disposed above and below each other (vertically disposed), where the horizontal plane is defined as the 360-degree azimuth plane located at elevation=0. In other words, the horizontal plane defined by elevation=0 for the first lens is parallel to, but is purposely displaced in the orthogonal (vertical) direction, compared to the horizontal plane defined by elevation=0 for the second lens. Being vertically displaced from one another, the two lenses are no longer required to have their optical axes displaced in the horizontal direction (as would be done in typical active stereo imaging arrangements), although the invention does allow horizontal displacement of the optical axes, in addition to the required vertical displacement. Thus with the present invention, it is possible to have the two lenses arranged with their primary optical axes co-linear or co-axial with one another. The two optical axes may face the same direction (both facing "up" or both facing "down") or they may be arranged to face opposite directions (with either the top one facing "up" and the bottom one facing "down", or with the bottom one facing "up" and the top one facing "down"). In preferred embodiments, the first and second lenses are each a panoramic annular lens (PAL). The processing device may form the 3D map by operations that include identifying a feature in an image from the first lens, identifying the same feature in an image from the second lens, and calculating a distance to the feature. The 3D map may include, for each pixel, red (R), green (G), blue (B), and distance (D) values.

In some embodiments, the panoramic stereoscopic camera operates over a high dynamic range (HDR). The camera may include a first optical subsystem with a first beam splitter disposed within an optical path of the first lens, such that the beam splitter directs received light onto a first high exposure (HE) sensor and a first middle exposure (ME) sensor, as well as a second such optical subsystem for the second lens.

Embodiments of the camera operate in real time, to produce real-time video. The processing device may stream pixel values from each of the plurality of image sensors in a frame-independent manner through a pipeline that includes a kernel operation that identifies saturated pixel values and a merge module to merge the pixel values to produce an HDR image. Preferably the first and second lens direct light through respective first and second beamsplitters onto respective first and second high exposure (HE) sensors and a middle exposure (ME) sensors. The first HE sensor and first ME sensor may receive images that are optically identical but for light level. In some embodiments, the kernel operation operates on pixel values as they stream from each of the plurality of image sensors by examining, for a given pixel on the HE sensor, values from a neighborhood of pixels surrounding the given pixel, finding saturated values in the neighborhood of pixels, and using information from a corresponding neighborhood on the ME sensor to estimate a value for the given pixel. In certain embodiments, the pipeline includes: a sync module to synchronize the pixel values as the pixel values stream onto the processing device from the plurality of image sensors; the kernel operation; the merge module; a demosaicing module; a distance module; and a compositing module.

For greater detail, the camera may include more than one pair of "stacked" sensors, e.g., with different pairs oriented along different axes. For example, the camera may include a third lens and a fourth lens that each have a field of view of at least 180 degrees, wherein the first lens and the second lens are offset from each other along a first vertical axis (which first vertical axis is defined in relation to the first and second lenses) and the third lens and the fourth lens are offset from each other along a second vertical axis orthogonal to the first axis (which second vertical axis is defined in relation to the third and fourth lenses).

Aspects of the invention provide a camera with a first lens and a second lens that each have an azimuthal field of view of at least 180 degrees, wherein the first lens and the second lens do not share an elevation=0 plane. The camera includes one or more image sensors that receive light from the first and second lens and a processing device coupled to the one or more image sensors and operable to form a 3D map from the received light, e.g., formed as a real-time video of an environment. The first and second lenses may each be a panoramic lens with a wide angle of coverage in azimuth (e.g., greater than 180 degrees) and may be disposed above and below each other with respect to the azimuth. For example, the first and second lenses may be PALs.

The processing device may form the 3D map by identifying a feature in an image from the first lens, identifying the feature in an image from the second lens, and calculating a distance to the feature. Thus, the 3D map may include, for each pixel, red (R), green (G), blue (B), and distance (D) values.

For HDR embodiments, the camera may include a first optical subsystem with at least a first beam splitter disposed within an optical path of the first lens to direct light onto a first high exposure (HE) sensor and a first middle exposure (ME) sensor, as well as a second such optical system for the second lens. Most preferably, the first HE sensor and first ME sensor receive images that are optically identical but for light level. The processing device may stream pixel values from each of the plurality of image sensors in a frame-independent manner through a pipeline that includes a kernel operation that identifies saturated pixel values and a merge module to merge the pixel values to produce an HDR image. In some embodiments, the kernel operation operates on pixel values as they stream from each of the plurality of image sensors by examining, for a given pixel on the HE sensor, values from a neighborhood of pixels surrounding the given pixel, finding saturated values in the neighborhood of pixels, and using information from a corresponding neighborhood on the ME sensor to estimate a value for the given pixel.

DETAILED DESCRIPTION

Figure 1:
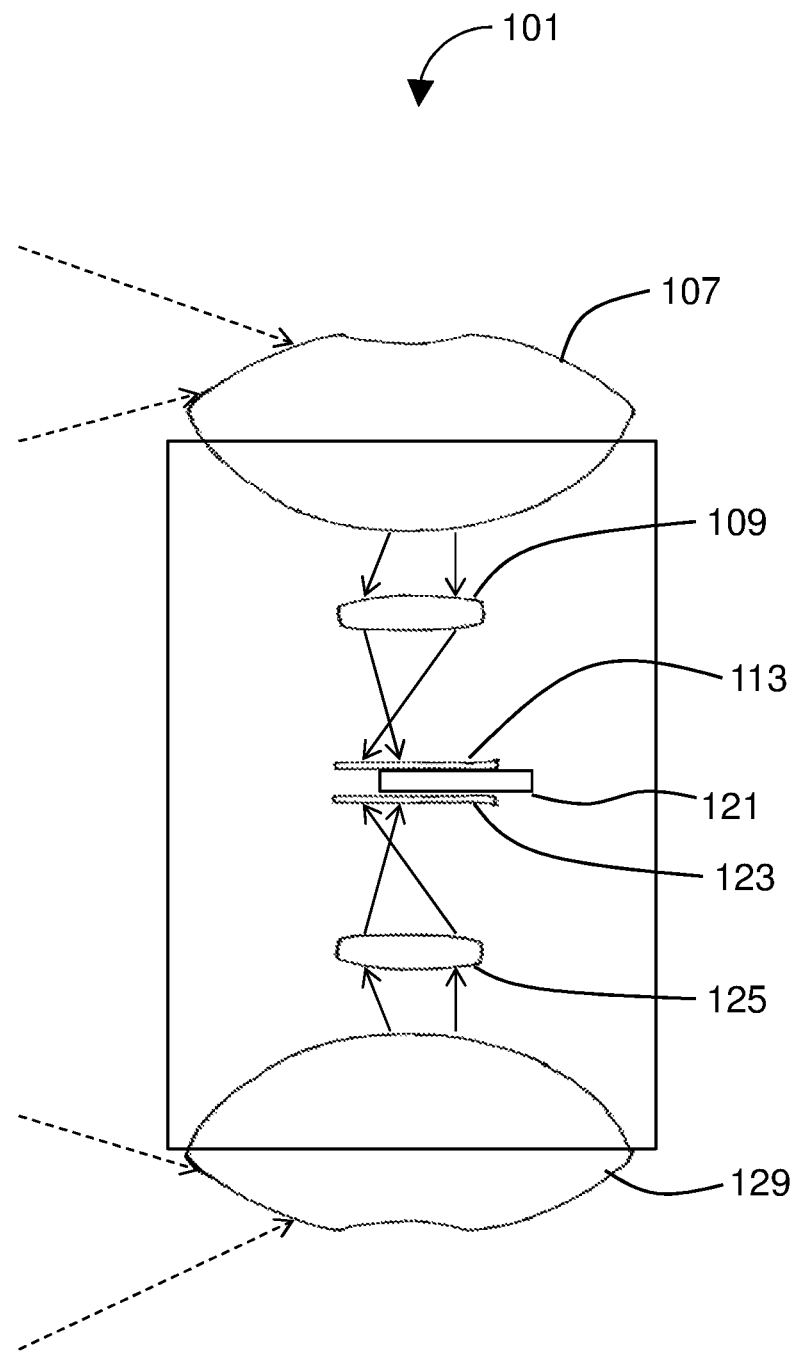
FIG. 1 shows a panoramic stereoscopic camera of certain embodiments.

FIG. 1 shows a panoramic stereoscopic camera 101. The camera 101 includes a first lens 107 and a second lens 129 that each have an azimuthal field of view of at least 180 degrees. Neither of the first lens 107 and the second lens 129 is within the field of view of the other. The camera 101 includes a first image sensor 113 that receives light from the first lens 107 through a collector lens 109. A second collector lens 125 passes light from the second lens 129 to a second image sensor 123. A processing device 121 is coupled to the image sensors 113, 123 and operates to form a three-dimensional map from the received light. The 3D map may be formed as, e.g., a real-time video of an environment. Preferably, the first and second lenses are each a panoramic lens with a wide angle of coverage (greater than 180 degrees) in azimuth and the first and second lenses are disposed above and below each other with respect to the azimuth. Preferably, the optical axes of the two lenses lie substantially in a line, so they are co-axial, although this is not a requirement for the invention.

Any suitable panoramic lens may be used. The camera 101 may operate with lenses that have any arbitrary azimuthal angle of coverage approaching and including 360 degrees. In certain embodiments, the first and second lenses are each a panoramic annular lens (PAL).

A panoramic annular lens (PAL) in some embodiments includes a single piece of glass, with spherical or aspherical surfaces that are partially mirrored, that produces a flat annular image of the entire 360-degree surround of the optical axis of the lens. PALs capable of imaging a scene of a 360 degree azimuth angle at a time have been disclosed in U.S. Pat. No. 4,566,763 to Greguss and U.S. Pat. No. 5,473,474 to Powell, both incorporated by reference.

Figure 2:
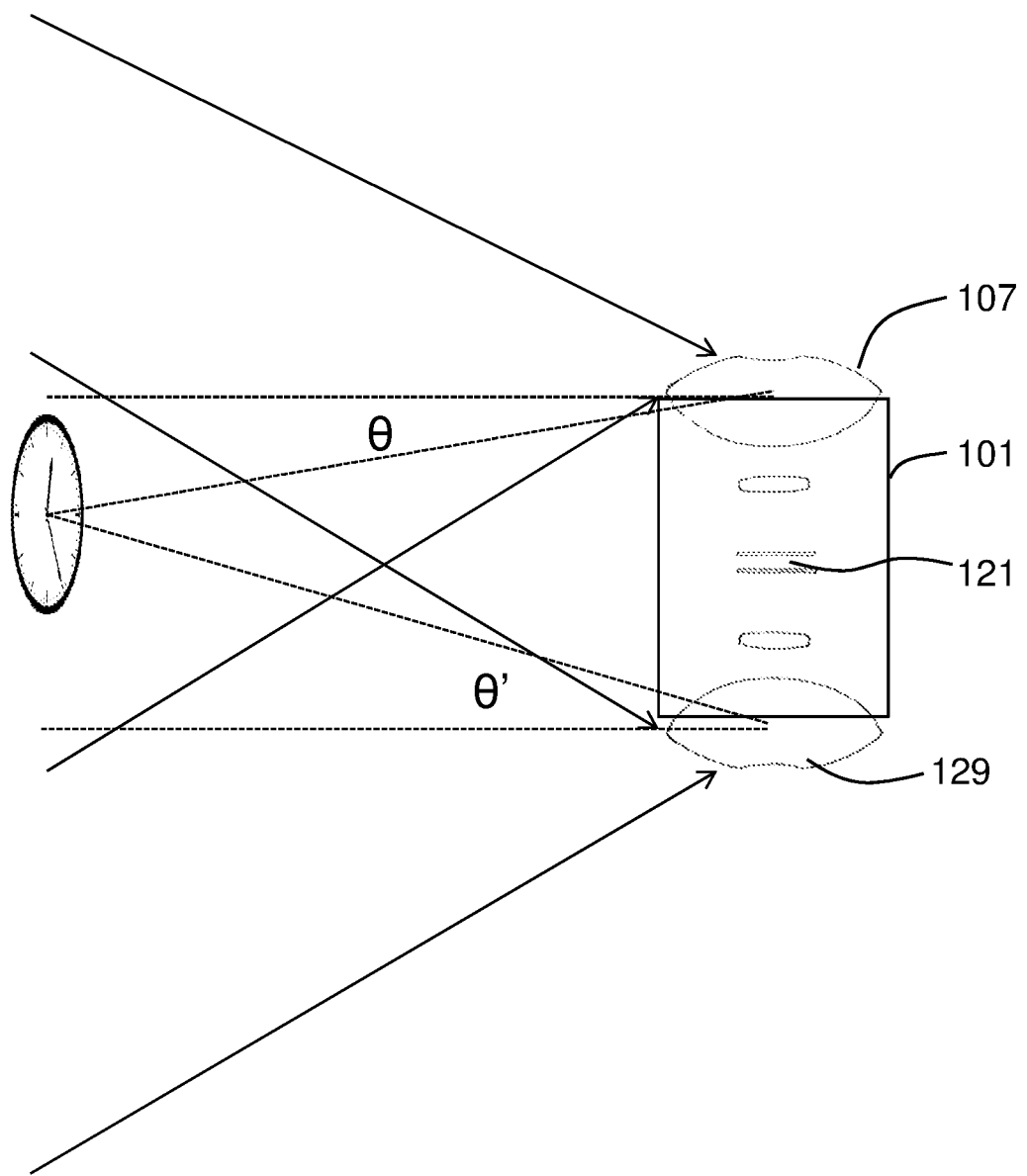
FIG. 2 shows the camera being used for 3D mapping.

FIG. 2 shows the camera 101 being used for 3D mapping. The camera 101 identifies a feature 215 in an image from the first lens 107 and also identifies the feature 215 in an image from the second lens 129. The processing device 121 calculates a distance to the feature to form a 3D map.

Figure 3:
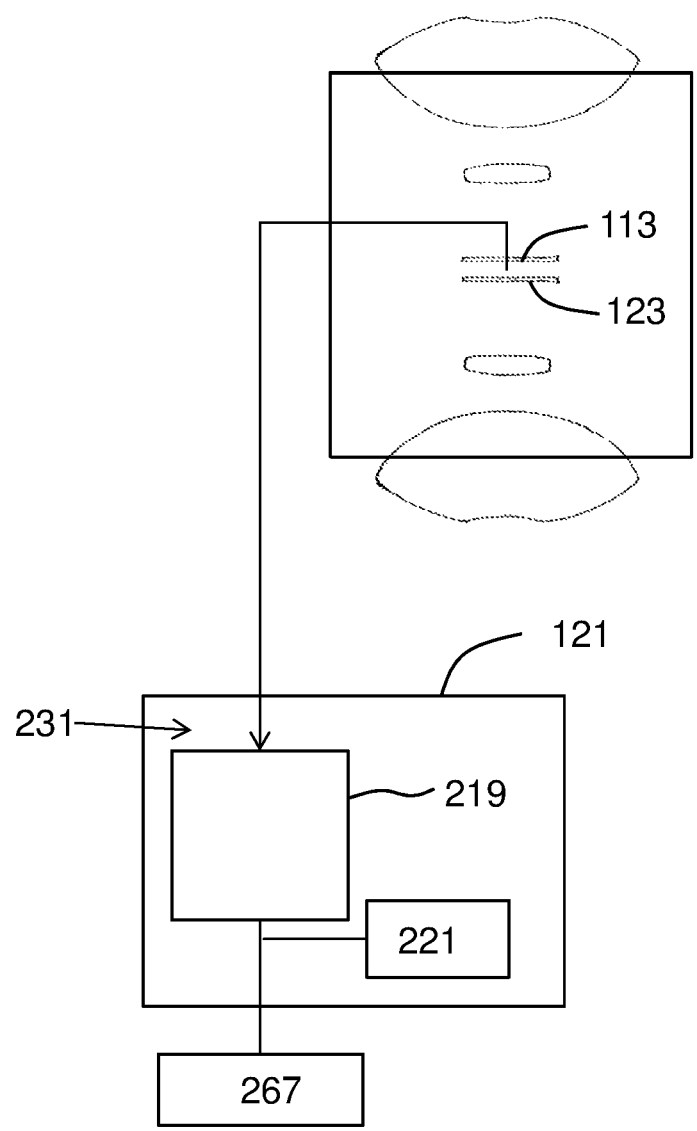
FIG. 3 shows details of the processing device of the camera.

FIG. 3 shows details of the processing device 121 of the camera 101 coupled to the image sensors 113, 123. In some embodiments, a chip 219 is mounted on a circuit board, which is mounted in the housing of camera 101. The chip 219 may be a general purpose computer processor, or may be an FPGA or ASIC. Pixel values stream from the image sensor 113, 123 onto the chip 219. The processing device may optionally include either of memory 221 and input/output device(s) 267 (such as a display). The processing device 121 identifies a feature in the pixels from the sensors 113, 123. Optionally, the processing device 121 uses a reference distance such as a calibration performed by operating the camera with a distance fiducial a known distance away. The processing device 121 calculates a distance (D) value for a pixel within the 3D map.

The panoramic stereoscopic camera has been described with respect to one possible arrangement of lenses and other arrangements of lenses are possible.

Figure 4:
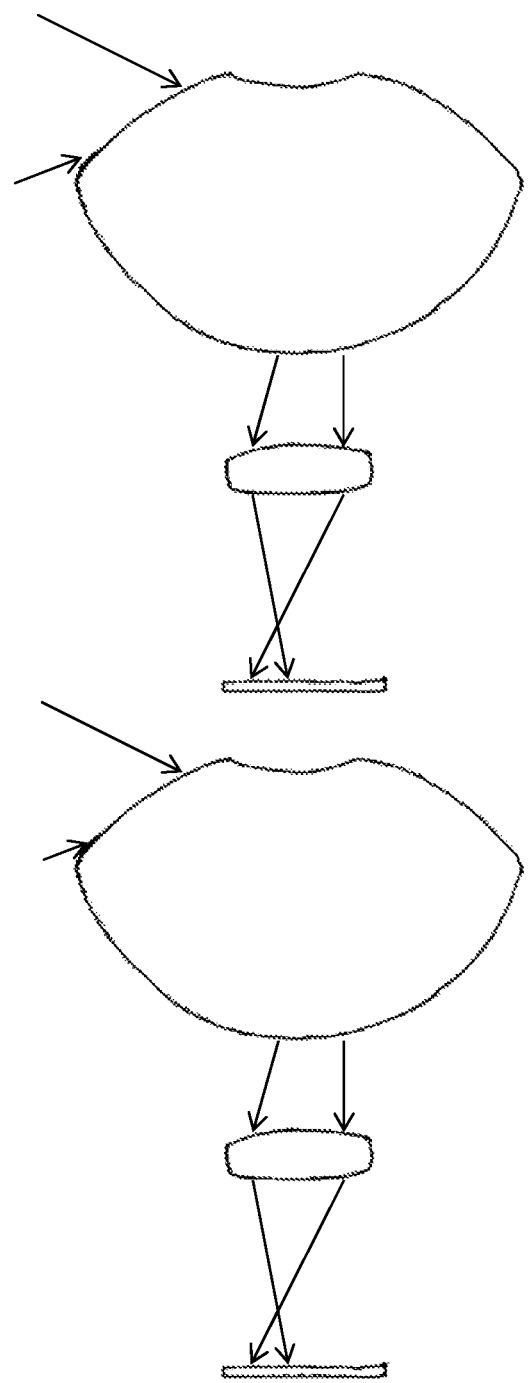
FIG. 4 depicts a head-to-toe arrangement lens embodiment.

FIG. 4 depicts an embodiment in which the first and second lenses are stacked in a head-to-toe arrangement. FIG. 1 depicts a toe-to-toe embodiment.

Figure 5:
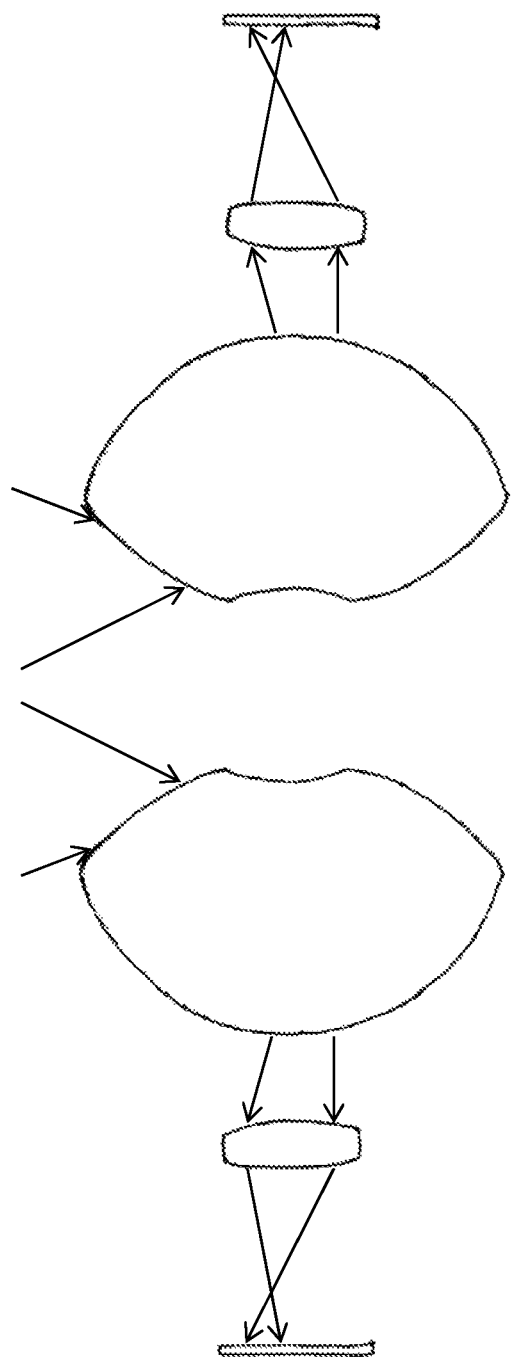
FIG. 5 illustrates a head-to-head embodiment.

FIG. 5 illustrates a head-to-head embodiment.

Figure 6:
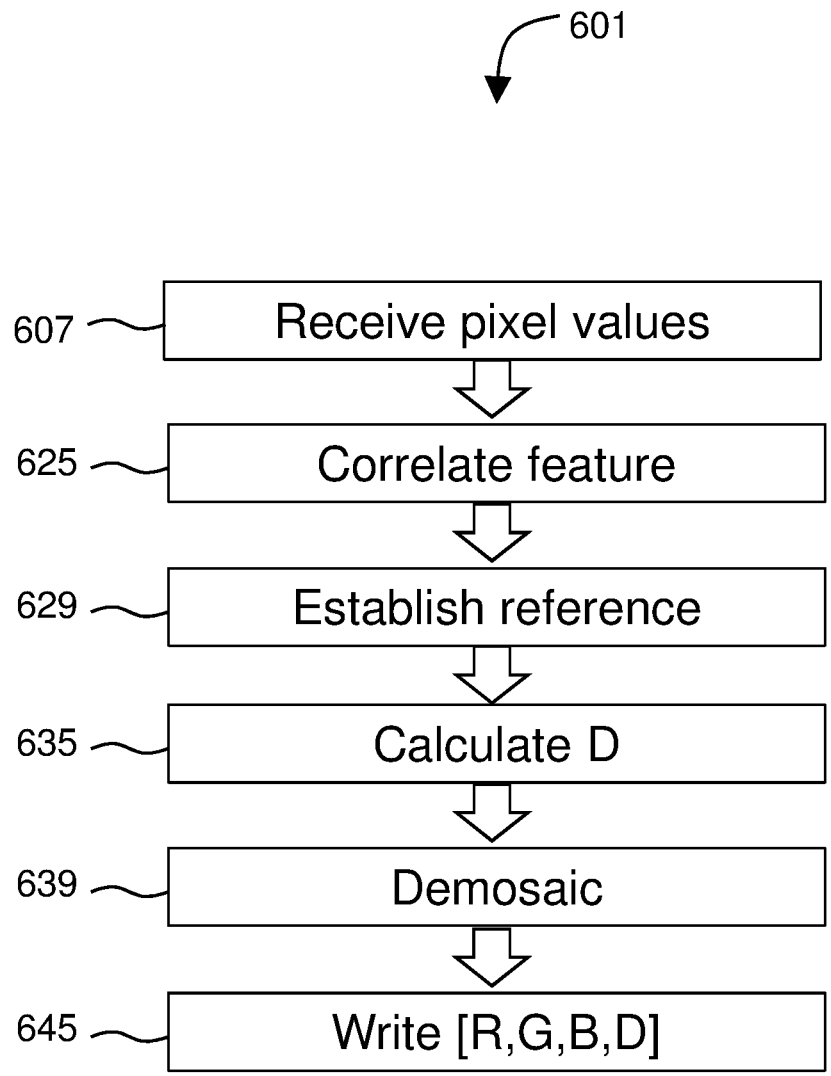
FIG. 6 shows steps of a method for 360-degree stereoscopic imaging.

FIG. 6 charts steps of a method 601 for active stereo imaging on a full 360-degree panoramic field of view. Using the camera 101, first lens 107 and the second lens 129 each direct light to their respective image sensors 113, 123. In some embodiments, each image sensor has a Bayer filter and streams mosaiced, scalar brightness values to the processing device 121. Because of the Bayer filter, the brightness values are for red (R), green (G), blue (B), and green (G) in a repeating patterns. With typical 8-bit image sensors, for example, the brightness values will range from 0 to 255. For any given pixel on an image sensor, the processing device 121 can calculate a distance (D) value. Additionally, the processing device 121 can de-mosaic the image so that each pixel has a vector of [R, G, B] values. The distance calculation and the demosaicing can happen in any order and may actually be performed in parallel on different modules on the processing device 121.

Thus, the method 601 for active stereo imaging includes receiving 607 pixel values from the image sensors. A feature is identified in the image from the first sensor and correlated 625 to the appearance of that feature in the image from the second sensor. The processing device 121 establishes 629 a reference distance. This can be performed using a calibration (e.g., initially operating the camera with a card with a distance fiducial a known distance away) or the camera can select an arbitrary feature as the reference and calculate distances relative to that reference (which can later be scaled if desired). The processing device then calculates 635 a distance (D) value for a pixel within what will be the output image. The camera also preferably demosaics 639 the images from the first and second sensors (optionally after merging them or selecting one) to provide the [R, G, B] values for the pixel within what will be the output image. The processing device 121 then combines 645 the values to create the output image in which the pixels have [R, G, B, D] values.

In preferred embodiments, the output image is a panoramic map, produced from the lenses that each have a field of view of at least 180 degrees and the described operations. Neither of the first lens 107 and the second lens 129 is within the field of view of the other. The camera 101 includes a first image sensor 113 that receives light from the first lens 107 through a collector lens 109. A second collector lens 125 passes light from the second lens 129 to a second image sensor 123. A processing device 121 is coupled to the image sensors 113, 123 and operates to form a three-dimensional map from the received light.

Using the described methods and devices, image processing is used, on a frame-by-frame basis, to map the apparent distance to all features within the scene. The camera may be operated to produce a video in which each pixel has not only red (R), green (G), and blue (B) values, but also an additional depth (D) value. A processing device calculates the amount of parallax present for each pixel in the scene and—using the known displacement distance between the two lenses—calculates the depth to each pixel. Thus, cameras of the invention perform active stereo imaging on a full 360-degree panoramic field of view, to create a 3D output that includes, for each pixel, red (R), green (G), blue (B), and distance (D) values.

Additionally, active stereo imaging on a full 360-degree panoramic field of view may be performed over a high dynamic range (HDR) using HDR mapping cameras and methods provided herein.

Figure 7:
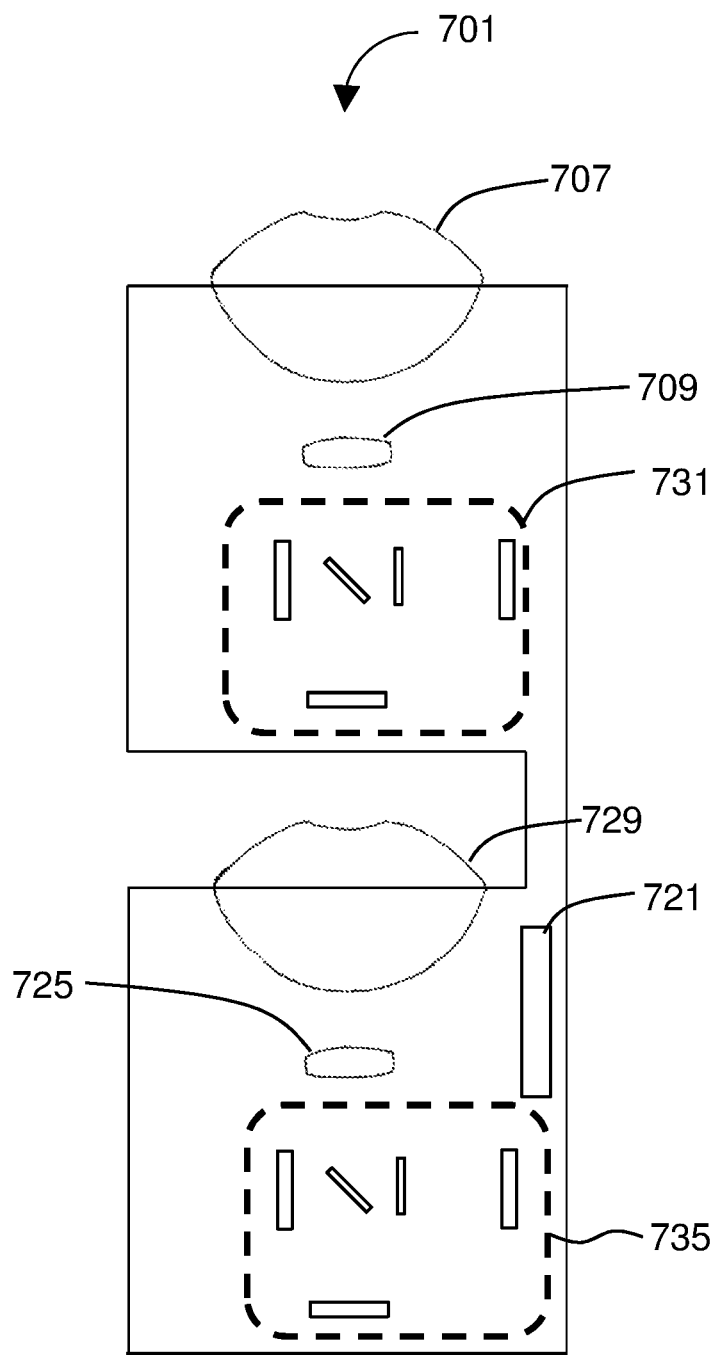
FIG. 7 shows optical systems of a HDR 3D mapping camera.
Figure 8:
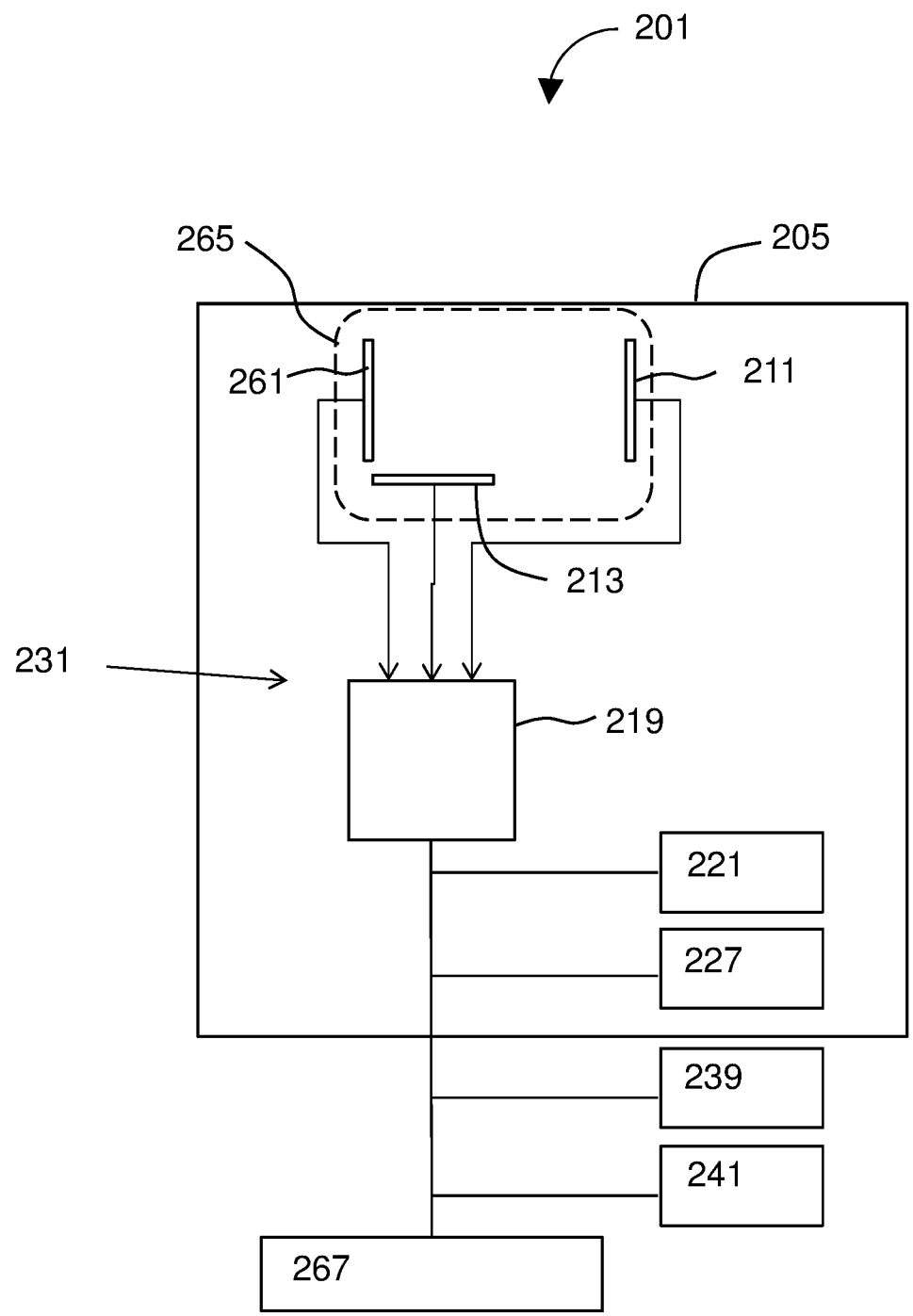
FIG. 8 shows processing systems of a HDR 3D mapping camera.

FIG. 7 shows optical systems of a HDR 3D mapping camera 701 and FIG. 8 shows processing systems of the HDR 3D mapping camera 701.

With reference to FIG. 7, the camera 701 includes a first lens 707 and a second lens 729 that each have a field of view of at least 180 degrees. Neither of the first lens 707 and the second lens 729 is within the field of view of the other. A head-toe arrangement is illustrated, but head-head, or toe-toe, arrangements are also options. The camera 701 includes a first optical subsystem 731 comprising at least a first beam splitter disposed within an optical path of the first lens, in which the beam splitter directs received light onto a first high exposure (HE) sensor and a first middle exposure (ME) sensor. The camera 701 also includes a second optical subsystem 735 with a second beam splitter disposed along an optical path of the second lens.

The first optical subsystem 731 and the second optical subsystem 735 each contain multiple sensors, the arrangement and function of which is described below with respect to FIG. 9. The processing device 721 is coupled to the first optical subsystem 731 and the second optical subsystem 735 and operates to form a three-dimensional map from the received light. Any suitable processor may be used for the processing device 721, such as a general purpose processor made by Intel (Hillsboro, Oreg.) or AMD (Sunnyvale, Calif.). In preferred embodiments, the processing device 721 includes an FPGA or ASIC.

In certain embodiments, the processing device 721 streams pixel values from each of the plurality of image sensors in a frame-independent manner through a pipeline on the processing device 721. The pipeline includes a kernel operation that identifies saturated pixel values and a merge module to merge the pixel values to produce an HDR image.

Preferably, the first and second lens direct light through respective first and second beamsplitters onto respective first and second high exposure (HE) sensors and a middle exposure (ME) sensors, in which the first HE sensor and first ME sensor receive images that are optically identical but for light level. The kernel operation may operate on pixel values as they stream from each of the plurality of image sensors by examining, for a given pixel on the HE sensor, values from a neighborhood of pixels surrounding the given pixel, finding saturated values in the neighborhood of pixels, and using information from a corresponding neighborhood on the ME sensor to estimate a value for the given pixel.

Due to the merged pixels from the HE and ME sensors, the resultant output is characterized by high dynamic range. Due to the two lenses and the distance calculations of the processing device 721, the resultant output comprises 3D data, such as a map of the local environment. Because the processing device 721 can stream the pixels through a pipeline (i.e., without the requirement to wait for, and operate on, an entire "frame's" worth of pixel values, video can stream from the camera in real time. Thus, the camera 701 may produce a 3D map, formed as a real-time video of an environment.

Cameras of the disclosure may include more than one pair of stacked lenses, e.g., with different pairs oriented along different axes. For example, an HDR stereoscopic camera may include a third lens and a fourth lens that each have a field of view of at least 180 degrees, in which the first lens and the second lens are offset from each other along a first axis and the third lens and the fourth lens are offset from each other along a second axis orthogonal to the first axis.

Thus an a HDR 3D mapping camera 701 of the disclosure preferably includes at least a first lens 707 and a second lens 729 that each have a field of view of at least 180 degrees, in which the first lens and the second lens are not co-planar with respect to the field of view of either lens. Cameras include one or more image sensors that receive light from the first and second lens and a processing device 721 coupled to the one or more image sensors and operable to form a three-dimensional map from the received light.

FIG. 8 shows a processing subsystem 201 for HDR video processing that may be included in a camera 701. The subsystem 201 includes a processing device 219 such as a field-programmable gate array (FPGA) or an application-specific integrated circuit (ASIC). A plurality of image sensors 265 are coupled to the processing device 219. The subsystem 201 is configured to stream pixel values from each of the plurality of image sensors 265 in a frame independent-manner through a pipeline 231 on the processing device 219. The pipeline 231 includes a kernel operation that identifies saturated pixel values 501 and a merge module to merge the pixel values to produce an HDR image.

Various components of the subsystem 201 may be connected via a printed circuit board 205. The subsystem 201 may also include memory 221 and optionally a processor 227 (such as a general-purpose processor like an ARM microcontroller). A subsystem 201 may further include or be connected to one or more of an input-output device 239 or a display 267. Memory can include RAM or ROM and preferably includes at least one tangible, non-transitory medium. A processor may be any suitable processor known in the art, such as the processor sold under the trademark XEON E7 by Intel (Santa Clara, Calif.) or the processor sold under the trademark OPTERON 6200 by AMD (Sunnyvale, Calif.). Input/output devices 239 according to the invention may include a video display unit (e.g., a liquid crystal display or LED display), keys, buttons, a signal generation device (e.g., a speaker, chime, or light), a touchscreen, an accelerometer, a microphone, a cellular radio frequency antenna, port for a memory card, and a network interface device, which can be, for example, a network interface card (NIC), Wi-Fi card, or cellular modem. The subsystem 201 may include or be connected to a storage device 241. The plurality of sensors are preferably provided in an arrangement that allows multiple sensors 265 to simultaneously receive images that are identical except for light level.

Figure 9:
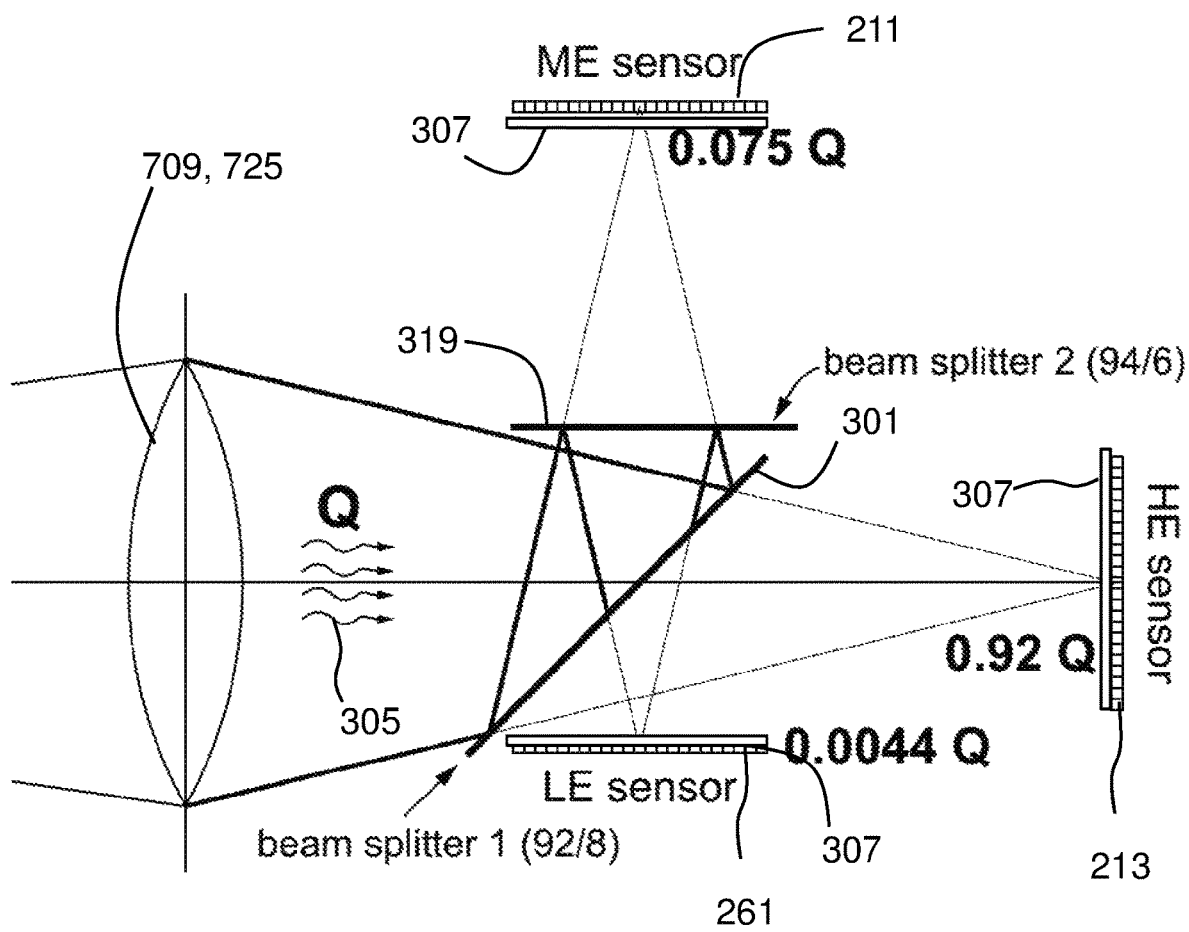
FIG. 9 shows an arrangement for the multiple sensors for HDR.

FIG. 9 shows an arrangement for the multiple sensors 265 of one optical subsystem 731, 735. The multiple sensors preferably include at least a high exposure (HE) sensor 213 and a middle exposure (ME) sensor 211. Each image sensor may have its own color filter array 307. The color filter arrays 307 may operate as a Bayer filter such that each pixel receives either red, green, or blue light. As is known in the art, a Bayer filter includes a repeating grid of red, green, blue, green filters such that a sequence of pixel values streaming from the sensor corresponds to values for red, green, blue, green, red, green, blue, green, red, green, blue, green, . . . etc.

Each subsystem 201 may also include or be optically connected to a collector lens 709, 725 and at least one beamsplitter 301. The HE sensor 213, the ME sensor 211, the collector lens 709, 725 and the at least one beamsplitter 301 are arranged to receive an incoming beam of light 305 and split the beam of light 305 into at least a first path that impinges and HE sensor 213 and a second path that impinges on the ME sensor 211. In a preferred embodiment, the subsystem 201 uses a set of partially-reflecting surfaces (e.g., beamsplitters) to split the light from collector lens 709, 725 so that it is focused onto three imaging sensors simultaneously. In a preferred embodiment, the light is directed back through one of the beamsplitters a second time, and the three sub-images are not split into red, green, and blue but instead are optically identical except for their light levels. This design, shown in FIG. 9, allows the camera to capture HDR images using most of the light entering the camera.

In some embodiments, the optical splitting system uses uncoated, 2-micron thick plastic beamsplitters that rely on Fresnel reflections at air/plastic interfaces so their actual transmittance/reflectance (T/R) values are a function of angle. Glass is also a suitable material option. In one embodiment, the first beamsplitter 301 is at a 45° angle and has an approximate T/R ratio of 92/8, which means that 92% of the light from collector lens 709, 725 is transmitted through the first beamsplitter 301 and focused directly onto the high-exposure (HE) sensor 213. The beamsplitter 301 reflects 8% of the light from the collector lens 709, 725 upwards (as shown in FIG. 9), toward the second beamsplitter 319, which has the same optical properties as the first but is positioned at a 90° angle to the light path and has an approximate T/R ratio of 94/6.

Of the 8% of the total light that is reflected upwards, 94% (or 7.52% of the total light) is transmitted through the second beamsplitter 319 and focused onto the medium-exposure (ME) sensor 211. The other 6% of this upward-reflected light (or 0.48% of the total light) is reflected back down by the second beamsplitter 319 toward the first beamsplitter 301 (which is again at 45°), through which 92% (or 0.44% of the total light) is transmitted and focused onto the low-exposure (LE) sensor 261. With this arrangement, the HE, ME and LE sensors capture images with 92%, 7.52%, and 0.44% of the total light gathered by the camera collector lens 709, 725, respectively. Thus a total of 99.96% of the total light gathered by the camera collector lens 709, 725 has been captured by the image sensors. Therefore, the HE and ME exposures are separated by 12.2× (3.61 stops) and the ME and LE are separated by 17.0× (4.09 stops), which means that this configuration is designed to extend the dynamic range of the sensor by 7.7 stops.

This beamsplitter arrangement makes the subsystem 201 light efficient: a negligible 0.04% of the total light gathered by the collector lens 709, 725 is wasted. It also allows all three sensors to "see" the same scene, so all three images are optically identical except for their light levels. Of course, in the apparatus of the depicted embodiment 201, the ME image has undergone an odd number of reflections and so it is flipped left-right compared to the other images, but this is fixed easily in software. In preferred embodiments, the three sensors independently stream incoming pixel values directly into a pipeline that includes a synchronization module. This synchronization module can correct small phase discrepancies in data arrival times to the system from multiple sensors.

Thus it can be seen that the beamsplitter 301 directs a majority of the light to the first path and a lesser amount of the light to the second path. Preferably, the first path and the second path impinge on the HE sensor 213 and the ME sensor 211, respectively, to generate images that are optically identical but for light level. In the depicted embodiment, the subsystem 201 includes a low exposure (LE) sensor.

In preferred embodiments, pixel values stream from the HE sensor 213, the ME sensor 211, and the LE sensor 261 in sequences directly to the processing device 219. Those sequences may be not synchronized as they arrive onto the processing device 219.

Methods of the invention may include receiving 107 incoming light through the collector lens 709, 725 and splitting 113 the light via at least one beamsplitter 301 onto the multiple image sensors, wherein at least 95% of the incoming beam of light 305 is captured by the multiple image sensors.

Figure 10:
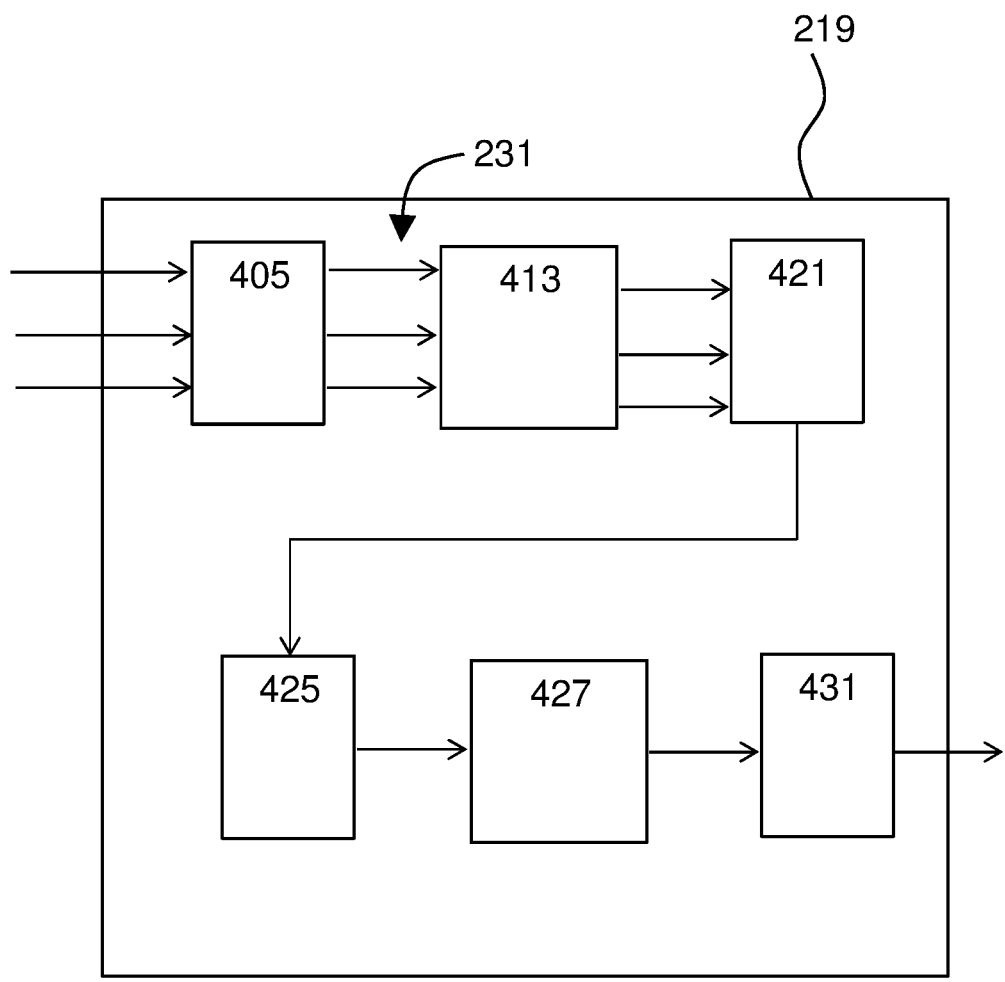
FIG. 10 shows the processing device on the HDR mapping camera.

FIG. 10 shows the processing device 219 on the subsystem 201. As noted, the processing device 219 may be provided by one or more FPGA, ASIC, or other integrated circuit. Pixel values from the sensors stream through the pipeline 231 on the processing device 219. The pipeline 231 in the processing device 219 includes—in the order in which the pixel values 501 flow: a sync module 405 to synchronize the pixel values 501 as the pixel values 501 stream onto the processing device 219 from the plurality of image sensors 265; the kernel operation 413; the merge module 421; a demosaicing module 425; stereoscopic module 427; and a compositing module 431.

The kernel operation 413 operates on pixel values 501 as they stream from each of the plurality of image sensors 265 by examining, for a given pixel on the HE sensor 213, values from a neighborhood 601 of pixels surrounding the given pixel, finding saturated values in the neighborhood 601 of pixels, and using information from a corresponding neighborhood 601 on the ME sensor 211 to estimate a value for the given pixel.

The stereoscopic module 427 calculates the depth (D) value for a pixel, and the compositing module 431 populates the output data with the [R,G,B,D] vectors.

The pipeline 231 may include one or more auxiliary module such as a color-correction module; an HDR conversion module; and an HDR compression module.

Figure 11:
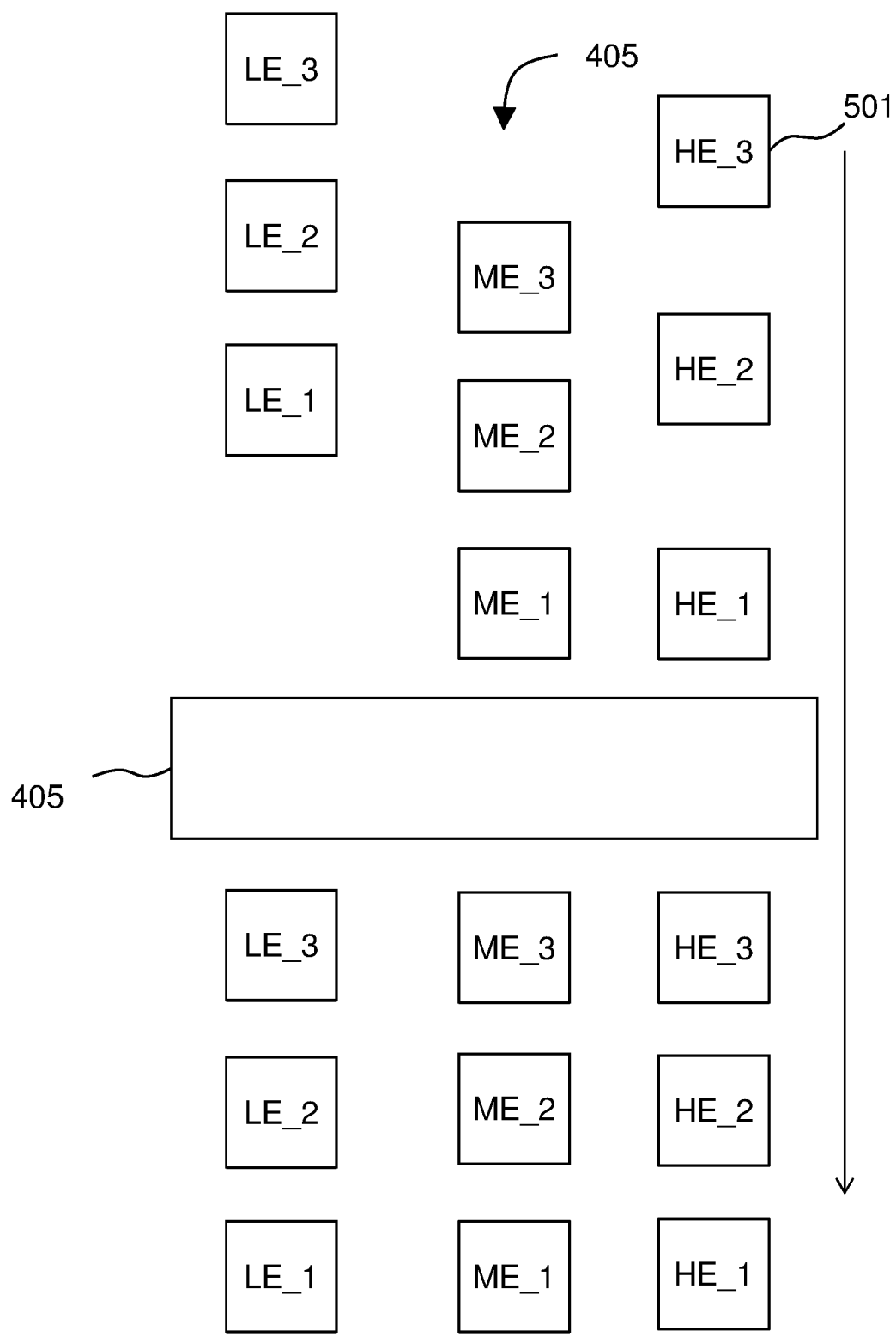
FIG. 11 shows operation of a sync module in the HDR mapping camera.

FIG. 11 shows operation of the sync module 405 to synchronize the pixel values 501 as the pixel values 501 stream onto the processing device 219 from the plurality of image sensors 265. As depicted in FIG. 5, HE_1 pixel value and ME_1 pixel value are arriving at the sync module 405 approximately simultaneously. However, HE_2 pixel value will arrive late compared to ME_2, and the entire sequence of LE pixel values will arrive late. The sync module 405 can contain small line buffers that circulate the early-arriving pixel values and release them simultaneous with the corresponding later-arriving pixel values. The synchronized pixel values then stream through the pipeline 231 to the kernel operation 413.

Figure 12:
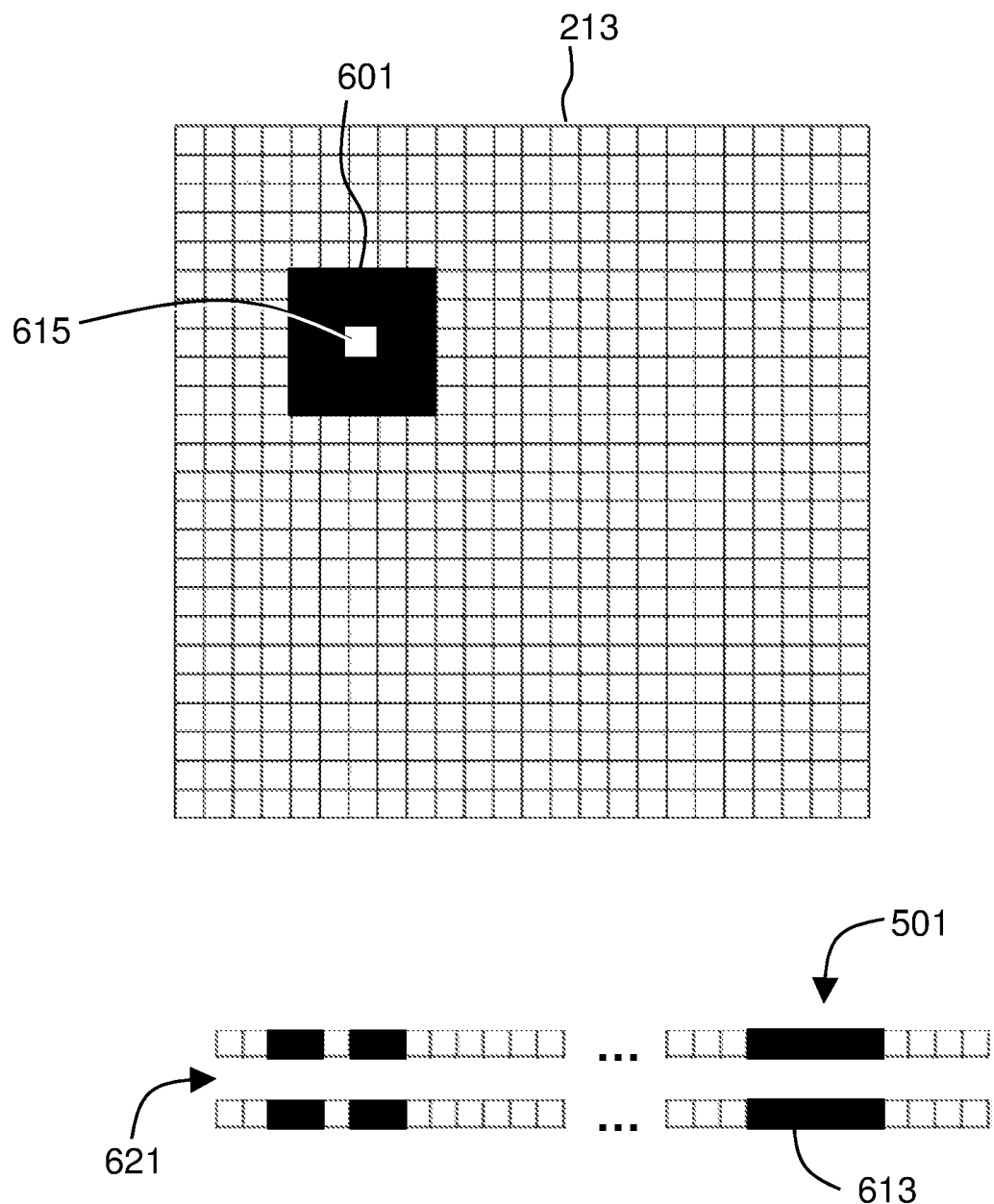
FIG. 12 shows a kernel operation for merging in the HDR mapping camera.

FIG. 12 illustrates how the pixel values are presented to the kernel operation 413. The top part of FIG. 12 depicts the HE sensor 213. Each square depicts one pixel of the sensor 213. A heavy black box with a white center is drawn to illustrate a given pixel 615 for consideration and a neighborhood 601 of pixels surrounding the given pixel 615. The heavy black box would not actually appear on a sensor 213 (such as a CMOS cinematic camera sensor)—it is merely drawn to illustrate what the neighborhood 601 includes and to aid understanding how the neighborhood 601 appears when the sequences 621 of pixel values 501 are presented to the kernel operation 413.

The bottom portion of FIG. 12 shows the sequences 621 of pixel values as they stream into the kernel operation 413 after the sync module 405. Pixel values 501 from the neighborhood 601 of pixels on the sensor 213 are still "blacked out" to aid illustration. The given pixel 615 under consideration can be spotted easily because it is surrounded on each side by two black pixels from the row of pixels on the sensor. There are two sequences 621, one of which comes from the depicted HE sensor 213 and one of which originates at the ME sensor 211.

Streaming the pixel values 501 through the kernel operation 413 includes examining values from a neighborhood 601 of pixels surrounding a first pixel 615 on the HE sensor 213, finding saturated values in the neighborhood 601 of pixels, and using information from a corresponding neighborhood 613 from the ME sensor 211 to estimate a value for the first pixel 615. This will be described in greater detail below. To accomplish this, the processing device must make comparisons between corresponding pixel values from different sensors. It may be useful to stream the pixel values through the kernel operation in a fashion that places the pixel under consideration 615 adjacent to each pixel from the neighborhood 601 as well as adjacent to each pixel from the corresponding neighborhood on another sensor.

Some HDR algorithms merge pixels after demosaicing and/or merge data pixel-by-pixel without taking neighboring pixel information into account. Methods of the disclosure preferably merge un-demosaiced pixels (scalar values in Bayer colors), taking into account information from neighboring pixels, or both. Merging may use a version of operations described in Debevec and Malik, 1997, Recovering high dynamic range radiance maps from photographs, Proceedings of ACM SIGGRAPH 1997:369-378, incorporated by reference.

Merging images by prior art algorithms that always use data from all three sensors with simple weighting functions. Methods of the disclosure, in contrast, use data from the higher-exposure sensor as much as possible and blend in data from the next darker sensor when near saturation. In certain embodiments, the method 601 and subsystem 201 not only examine individual pixels when merging the LDR images, but also take into account neighboring pixels 601

(see FIG. 12) that might provide additional information to help in the de-noising process.

One aspect of merging 139 according to the invention is to use pixel data exclusively from the brightest, most well-exposed sensor possible. Therefore, pixels from the HE image are used as much as possible, and pixels in the ME image are only used if the HE pixel is close to saturation. If the corresponding ME pixel is below the saturation level, it is multiplied by a factor that adjusts it in relation to the HE pixel based on the camera's response curve, given that the ME pixel receives 12.2× less irradiance than the HE pixel.

In some embodiments as illustrated in FIG. 12, the method 601 and subsystem 201 use a 5×5 pixel neighborhood 601 (k=2), and define a pixel to be saturated if its value is greater than some specific amount, for example 90% of the maximum pixel value (4096 e.g., where sensor 213 is a 12-bit CMOS sensor).

In certain embodiments, the merging 139 includes a specific operation for each of the four cases for the pixel 615 on sensor 213 and its neighborhood 601 (see FIG. 6):

Case 1: The pixel 615 is not saturated and the neighborhood 601 has no saturated pixels, so the pixel value is used as-is.

Case 2: The pixel 615 is not saturated, but the neighborhood 601 has 1 or more saturated pixels, so blend between the pixel value at IHE(x, y) and the one at the next darker-exposure IME(x, y) depending on the amount of saturation present in the neighborhood.

Case 3: The pixel 615 is saturated but the neighborhood 601 has 1 or more non-saturated pixels, which can be used to estimate a value for IHE(x,y): calculate the ratios of pixel values in the ME image between the unsaturated pixels in the neighborhood and the center pixel, and use this map of ME ratios to estimate the actual value of the saturated pixel under consideration.

Case 4: The pixel 615 and all pixels in the neighborhood 601 are saturated, so there is no valid information from the high-exposure image, use the ME image and set IHDR(x, y)=IME(x, y).

When there are three LDR images, the process above is simply repeated in a second iteration, substituting IHDR for IHE and ILE for IME. In this manner, data is merged 139 from the higher exposures while working toward the lowest exposure, and data is only used from lower exposures when the higher-exposure data is at or near saturation.

This produces an HDR image that can be demosaiced and converted from pixel values to irradiance using a camera response curve. The final HDR full-color image may optionally be tone mapped (e.g., with commercial software packages such as FDRTools, HDR Expose, Photomatix, etc.)

The subsystem 201 may be implemented using three Silicon Imaging SI-1920HD high-end cinema CMOS sensors mounted in a camera body. Those sensors have 1920× 1080 pixels (5 microns square) with a standard Bayer color filter array, and can measure a dynamic range of around 10 stops (excluding noise). The sensors are aligned by aiming the camera at small pinhole light sources, locking down the HE sensor and then adjusting setscrews to align the ME and LE sensors.

The camera body may include a lens mount for each lens. For beamsplitters, the apparatus may include uncoated pellicle beamsplitters, such as the ones sold by Edmund Optics [part number NT39-482]. The subsystem 201 may perform the steps of the method 601. Preferably, the multiple image sensors include at least a high exposure (HE) sensor 213 and a middle exposure (ME) sensor 211, and the merging includes using HE pixel values 501 that are not saturated and ME pixel values 501 corresponding to the saturated pixel values. The multiple sensors may further include a low exposure (LE) sensor 261, and the method 601 may include identifying saturated pixel values 501 originating from both the HE sensor 213 and the ME sensor 211. Because the pixel values stream through a pipeline, it is possible that at least some of the saturated pixel values 501 are identified before receiving values from all pixels of the multiple image sensors at the processing device 219 and the method 601 may include beginning to merge 139 portions of the sequences while still streaming 129 later-arriving pixel values 501 through the kernel operation 413.

In the described method 601, the image sensors of one imaging subsystem 731, 735 all capture images simultaneously through a single collector lens 709, 725. The pipeline 231 and kernel operation 135 may be provided by an integrated circuit such as a field-programmable gate array or an application-specific integrated circuit. Each of the image sensors may include a color filter array 307. In preferred embodiments, the method 601 includes demosaicing 145 the HDR image after the merging step 139. The multiple image sensors preferably capture images that are optically identical except for light level.

A feature of the invention is that the pixel values 501 may be pipeline processed in a frame-independent manner. Sequences of pixel values 501 are streamed 129 through the processing device 219 and merged 139 without waiting to receive pixel values 501 from all pixels on the image sensors. This means that the obtaining 125, streaming 129, and merging 139 steps may be performed by streaming 129 the sequences of pixel values 501 through the pipeline 231 on the processing device 219 such that no location on the processing device 219 stores a complete image. Because the pixel values are streamed through the pipeline, the final HDR data output signal is produced in real-time. Subsystem 201 performing steps of the method 601 thus provides the function of a real-time HDR 3D mapping camera. Real-time means that HDR data from the camera may be output essentially simultaneously as the camera captures the scene (e.g., at the speed that the signal travels from sensor to display minus a latency no greater than a frame of video, which in the current state of the art is typically 1/60 of a second). There is no requirement for post-processing the image data and no requirement to capture, store, compare, or process entire "frames" of images.

The output is an HDR 3D map because the method 601 and the subsystem 201 use multiple sensors at different exposure levels to capture multiple isomorphic images (i.e., identical but for light level) and merge them. Data from a high exposure (HE) sensor are used where portions of an image are dim and data from a mid-exposure (ME) (or lower) sensor(s) are used where portions of an image are more brightly illuminated. The method 601 and subsystem 201 merge the HE and ME (and optionally LE) images, and calculate distance (D) values for pixels, to produce an HDR 3D data output.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A camera comprising:
a first optical subsystem comprising at least a first beam splitter disposed within an optical path of a first lens, wherein the beam splitter directs light onto a first higher-exposure (HE) sensor and a first lower-exposure (LE) sensor; and
a second optical subsystem with a second beam splitter disposed along an optical path of a second lens, wherein the second beam splitter directs received light onto a second HE sensor and a second LE sensor,
wherein the first lens and the second lens that are disposed vertically with respect to each other and have a field of view of at least 180 degrees; and
a processing device coupled to the sensors and operable to stream pixel values from the sensors in a frame-independent manner through a pipeline that includes
a sync module that synchronizes pixel values from the sensors by circulating early-arriving pixel values in line buffers and releasing the early-arriving pixel values simultaneously with corresponding later-arriving pixel values,
a kernel operation that identifies saturated pixel values as they stream from each of the plurality of image sensors by, for a given pixel on the HE sensor, (i) streaming the pixel values through the kernel operation in a manner that places the given pixel from the HE sensor adjacent to each pixel value from a neighborhood of pixels surrounding the given pixel and each pixel value from the corresponding neighborhood on the ME sensor, (ii) finding saturated values in the neighborhood of pixels, and (iii) using information from a corresponding neighborhood on the ME sensor to estimate a value for the given pixel, and
a merge module to merge the pixel values to form a high-dynamic range (HDR) three-dimensional (3D) real-time video from the received light.

2. The camera of claim 1, wherein the merge module merges at least some of the pixel values from HE sensor and the ME sensor without waiting to receive pixel values from all of the pixels on the HE sensor and the ME sensor.

3. The camera of claim 1, wherein the first HE sensor and first LE sensor receive images that are optically identical but for light level.

4. The camera of claim 3, wherein the 3D video comprises, for each pixel, red (R), green (G), blue (B), and distance (D) values.

5. The camera of claim 4, wherein the processing device comprises a field-programmable gate array or an application-specific integrated circuit that includes the pipeline.

6. The camera of claim 5, wherein the pipeline includes:
a sync module to synchronize the pixel values as the pixel values stream onto the processing device from the plurality of image sensors;
the kernel operation;
the merge module;
a demosaicing module;
a distance module; and
a compositing module.

7. A camera comprising:
a first optical subsystem comprising at least a first beam splitter disposed within an optical path of a first lens, wherein the beam splitter directs light onto a first higher-exposure (HE) sensor and a first lower-exposure (LE) sensor; and
a second optical subsystem with a second beam splitter disposed along an optical path of a second lens, wherein the second beam splitter directs received light onto a second HE sensor and a second LE sensor,
wherein the first lens and the second lens that are disposed vertically with respect to each other and have a field of view of at least 180 degrees; and
a processing device coupled to the sensors and operable to stream pixel values from the sensors in a frame-independent manner through a pipeline that includes
a sync module that synchronizes pixel values from the sensors by circulating early-arriving pixel values in line buffers and releasing the early-arriving pixel values simultaneously with corresponding later-arriving pixel values,
a kernel operation that identifies saturated pixel values as they stream from each of the plurality of image sensors by, for a given pixel on the HE sensor, (i) streaming the pixel values through the kernel operation in a manner that places the given pixel from the HE sensor adjacent to each pixel value from a neighborhood of pixels surrounding the given pixel, (ii) finding saturated values in the neighborhood of pixels, and (iii) using information from a corresponding neighborhood on the ME sensor to estimate a value for the given pixel, and
a merge module to merge the pixel values to form a high-dynamic range (HDR) three-dimensional (3D) real-time video from the received light, wherein the merge module:
uses the given pixel from the HE sensors as-is when the given pixel is not saturated and the neighborhood has no saturated pixels; and
blends a value of the given pixel with a value of a corresponding pixel from the ME sensor when the given pixel is not saturated by the neighborhood has one or more saturated pixels.

8. The camera of claim 7, wherein the first HE sensor and first LE sensor receive images that are optically identical but for light level.

9. The camera of claim 8, wherein the 3D video comprises, for each pixel, red (R), green (G), blue (B), and distance (D) values.

10. The camera of claim 9, wherein the processing device comprises a field-programmable gate array or an application-specific integrated circuit that includes the pipeline.

11. The camera of claim 10, wherein the pipeline includes:
a sync module to synchronize the pixel values as the pixel values stream onto the processing device from the plurality of image sensors;
the kernel operation;
the merge module;
a demosaicing module;
a distance module; and
a compositing module.

* * * * *